United States Patent [19]

Hamanishi

[11] Patent Number: 4,653,871
[45] Date of Patent: Mar. 31, 1987

[54] REAR CONVERSION LENS
[75] Inventor: Yoshinari Hamanishi, Tokyo, Japan
[73] Assignee: Nippon Kogaku K. K., Tokyo, Japan
[21] Appl. No.: 685,300
[22] Filed: Dec. 24, 1984
[30] Foreign Application Priority Data
Dec. 26, 1983 [JP] Japan .................................. 58-249095
[51] Int. Cl.⁴ .......................... G02B 15/02; G02B 9/40; G02B 9/60
[52] U.S. Cl. .................... 350/422; 350/465; 350/471
[58] Field of Search ............... 350/422, 465, 469, 470, 350/471

[56] References Cited
U.S. PATENT DOCUMENTS
4,206,971 6/1980 Hamanishi et al. ................. 350/422
4,514,051 4/1985 Hamanishi ............................ 350/465

Primary Examiner—John K. Corbin
Assistant Examiner—Scott J. Sugarman
Attorney, Agent, or Firm—Shapiro and Shapiro

[57] ABSTRACT

A rear conversion lens is composed of a front lens group comprising three lenses of positive, negative and positive from the object side and a rear lens group comprising two lenses of negative and positive from the object side and satisfying certain conditions.

9 Claims, 7 Drawing Figures

REAR CONVERSION LENS

BACKGROUND OF THE INVENTION

1. Field of the Invention

The present invention relates to a rear conversion lens which is mounted on the image space side of a camera lens in order to expand the focal length of the object lens. More specifically the present invention is directed to improvements in such rear conversion lens attachable even to very bright objective lenses.

2. Description of the Prior Art

In the art there are known and used various rear conversion lenses adapted for those objective lenses having a large relative aperture. These known rear conversion lenses generally have a magnification in the range of 1.4 to 1.5 and have an advantage that they are attachable to the so-called bright objective lens without darkening the latter so much. The composite lens brightness resulting from the attachment of the rear conversion lens is only about one step lower than that of the original objective lens in terms of step of aperture stop. For this advantage the rear conversion lens has been admitted to be of high utility value in particular when used in combination with a telephoto lens of large relative aperture. Examples of such rear conversion lens having a magnification of around 1.4 and good performance are disclosed in U.S. Pat. No. 4,206,971 (corresponding to Japanese Patent Publication No. 42726/1980) and Japanese Patent Application Laid-Open No. 123515/1983. However, these prior art rear conversion lenses are still unsatisfactory in some respects. For example, in case of the rear conversion lens disclosed in the first-mentioned patent publication, the correction of astigmatism and astigmatic difference is insufficient. The rear conversion lens disclosed in the second-mentioned patent publication has the drawback that when it is attached to a super telephoto lens in which the exit pupil of the objective lens is at a long distance from the image plane, there arises difficulty in obtaining a sufficient quantity of marginal light.

SUMMARY OF THE INVENTION

Accordingly it is the general object of the present invention to overcome the drawbacks of the prior art rear conversion lenses as mentioned above and to provide an improved rear conversion lens which enables to obtain a sufficient quantity of marginal light even when attached to such a telephoto lens where exit pupil is at a long distance and which can assure always good image-forming performance.

According to the present invention the above object is attained by a rear conversion lens composed of a front lens group comprising three lenses of positive, negative and positive from the object side and a rear lens group comprising two lenses of negative and positive from the object side and satisfying the following conditions:

$$0.2 < f_1/f_2 < 4 \quad (1)$$

and $$0.2 < f_R/f_1 < 0.85 \quad (2)$$

wherein,
$f_R$ is the focal length of the rear conversion lens;
$f_1$ is the focal length of the front group and
$f_2$ is the focal length of the rear group.

The condition (1) limits the ratio of the refractive power of the front group / the refractive power of the rear group in the rear conversion lens according to the invention. When the condition (1) is satisfied, the front lens group and the rear lens group have the optimum shares of refractive power for the aimed rear conversion lens. If the refractive power of the rear group is too strong exceeding the upper limit of the condition (1) for a constant magnification, then it is very difficult to keep a sufficient back focus. On the contrary, if the lower limit of the condition (1) is exceeded, the refractive power of the rear group becomes too weak as compared with that of the front lens. An unduely large diameter is required for the most-image side lens. In addition the front group needs an increased number of lenses to correct the spherical aberration and the comma aberration. As a whole, therefore, the construction of the rear conversion lens is rendered too complicate to be acceptable.

The condition (2) is a supplement to the condition (1). The condition (2) limits the ratio of the total refractive power of the rear conversion lens to the refractive power of the front lens group. If the ratio is over the upper limit while keeping the magnification constant, the refractive power of the front group becomes too strong to obtain a sufficient back focus. Assuming that the air distance between the front and rear lens groups is constant, the necessary sufficient back focus can be obtained only by increasing the distance from the front-most lens surface of the rear conversion lens to the image point by the objective lens, that is, by lengthening the object distance $d_0$ of the rear conversion lens. Such a long object distance reduces the utility of the rear conversion lens and the range of its use is narrowed thereby. On the contrary, if the ratio if under the lower limit of the condition (2), then the refractive power of the whole system is too strong and Petzval sum becomes too large in the sense of negative to adequately correct the astigmatic difference. Furthermore, when the object distance $d_0$ as rear conversion lens is reduced, the diameter of the lenses in the front group is rendered too large and it is difficult to retain the sufficient back focus.

In the rear conversion lens according to the invention, it is possible to make the central rays and the oblique rays pass across the respective lenses of the rear group at different points by broadening the air distance D between the front group and the rear group. By doing so, man can positively obtain the freedom for correcting the aberrations by the off-axis rays and the on-axis rays. However, if the air distance D between the front and rear groups is widened too much, then there arises difficulty in obtaining the sufficient back focus. In addition, the diameter of the most-image side lens becomes too large. In view of the fact, it is desirable for the rear conversion lens to additionally satisfy the following condition:

$$0.04 < |D/f_R| < 0.1 \quad (3)$$

In a further preferred embodiment of the invention, the air distance between the first component positive lens and the second component negative lens of the first group is larger than the air distance between the third component positive lens and the second component negative lens of the front group. In this embodiment, the inward coma and the outward coma caused by the rays under and above the principal ray at a small angle of field can be corrected easily. Also, the spherical aberration can sufficiently be corrected at the same time. However, if the distance between the first and second components is widened too much, difficulties arise in correcting the astigmatic difference. In order to adequately correct astigmatic difference and chromatic aberration at the same time man should suitably select the refractive index (n—) and Abbe's number (ν—) of the negative lenses in the front and rear lens groups, preferably to satisfy the conditions:

n— > 1.8 and ν— > 40.

The adaptability for many uses of the rear conversion lens will increase with decreasing the distance $d_0$ between the frontmost lens surface of the rear conversion lens and the image point of the objective lens. In other words, when the rear conversion lens can be attached on an objective lens at a position distant from the latter as long as possible, it has higher utility for many applications. However, when the rear conversion lens is to be attached to such an objective lens whose exit pupil is at a long distance, it is desired to mount the rear conversion lens at a position near the objective lens as close as possible. The reason for this is that a larger quantity of marginal light can be obtained by it. In addition, in this case, the negative refractive power required for the rear conversion lens can be smaller, which enables the rear conversion lens to have a more advantageous value of Petzval sum. In this point of view, in a preferred embodiment of the invention, the rear conversion lens satisfies the condition:

$0 < Pz \cdot f_R < 0.2$ wherein, Pz is the Petzval sum of the rear conversion lens. A better correction of astigmatic difference is assured when the above condition is satisfied.

Preferred embodiments of the invention will be described hereinafter with reference to the accompanying drawings.

DESCRIPTION OF THE PREFERRED EMBODIMENTS

Figure 1:
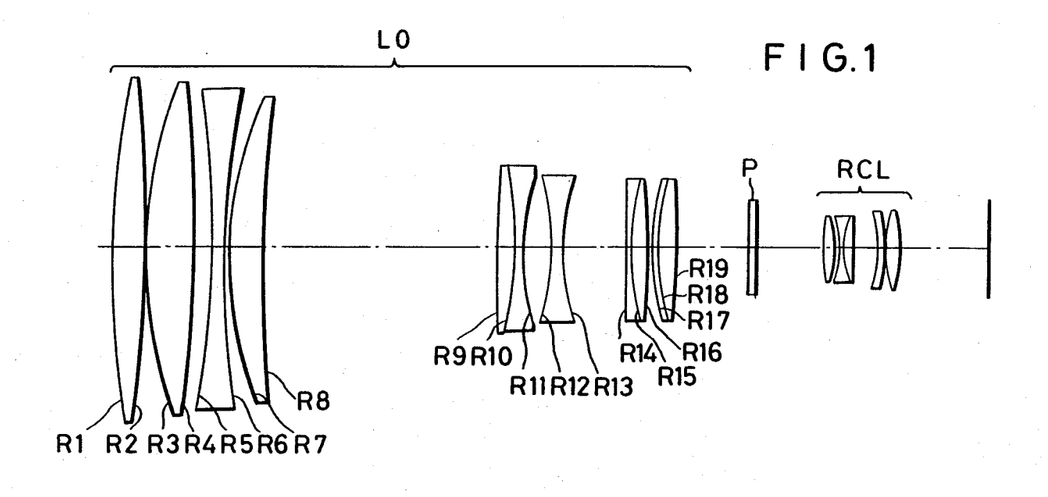
FIG. 1 schematically shows the arrangement of lens components of a base objective lens with a rear conversion lens (as the first embodiment) attached thereto.
Figure 2:
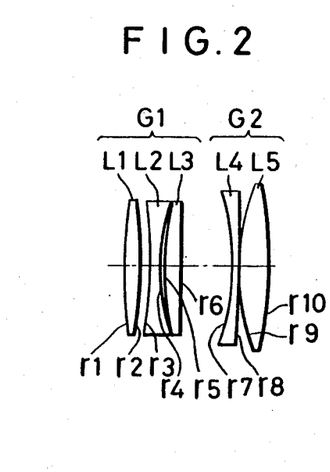
FIG. 2 is a view showing the construction of the first embodiment rear conversion lens.

The base objective lens for which the following rear conversion lenses have been designed according to the present invention is a large relative aperture telephoto lens of focal length f=300 mm and F-number=2.0. The physical data of the base objective lens are shown in the following table, Table 1. FIG. 1 shows the arrangement of the components of the base objective lens $L_0$ with an attached rear conversion lens RCL as the first embodiment of the invention. The physical data of the first embodiment rear conversion lens are shown in the following Table 2. FIG. 2 shows, in an enlarged view, the construction of the first embodiment. The base objective lens per se is the subject matter of our prior patent application, Japanese Patent Application No. 137379/1983. However, in the arrangement shown in FIG. 1, there is disposed a filter P at 31.504 behind the rearmost surface ($R_{19}$) of the objective lens. The refractive index of the filter P is 1.5168 and its Abbe's number is 64.1.

As seen from FIG. 2, the front group $G_1$ of the first embodiment comprises a convexo-convex positive lens L, as the first component, a concavo-concave negative lens $L_2$ as the second component and a positive lens $L_3$ as the third embodiment arranged in the named order as viewed from the object side. The stronger curved surface of the third component $L_3$ faces to the object side. The rear group $G_2$ comprises a concavo-concave negative lens $L_4$ as the first component and a convexo-convex positive lens $L_5$ as the second component. The concavo-concave negative lens $L_4$ of the rear group is more strongly curved on the object side than on the image side.

The second and third embodiments the data of which are shown in the following Tables 3 and 4 have substantially the same construction as that of the first embodiment shown in FIG. 2 and need not be further described.

Figure 3:
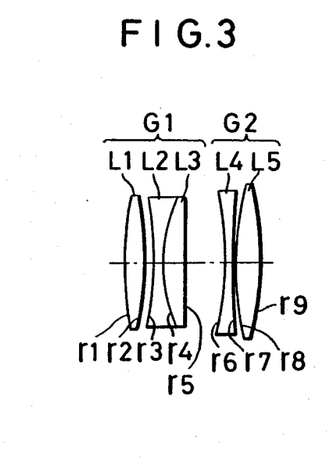
FIG. 3 is a view showing the construction of the fourth embodiment rear conversion lens.
Figure 4:
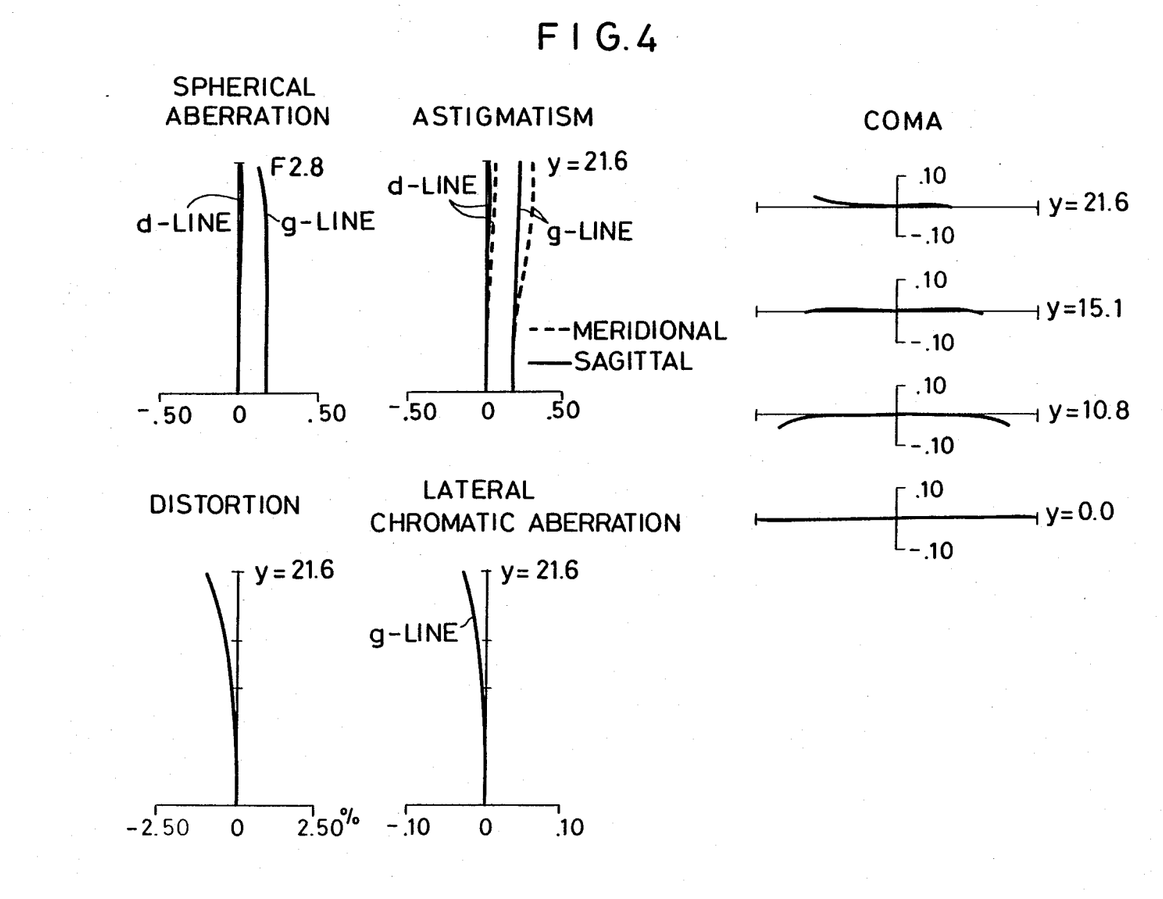
FIGS. 4, 5, 6 and 7 are graphic views showing aberrations obtained when the first to fourth embodiments of the rear conversion lens according to the invention were attached to the base objective lens, respectively.
Figure 5:
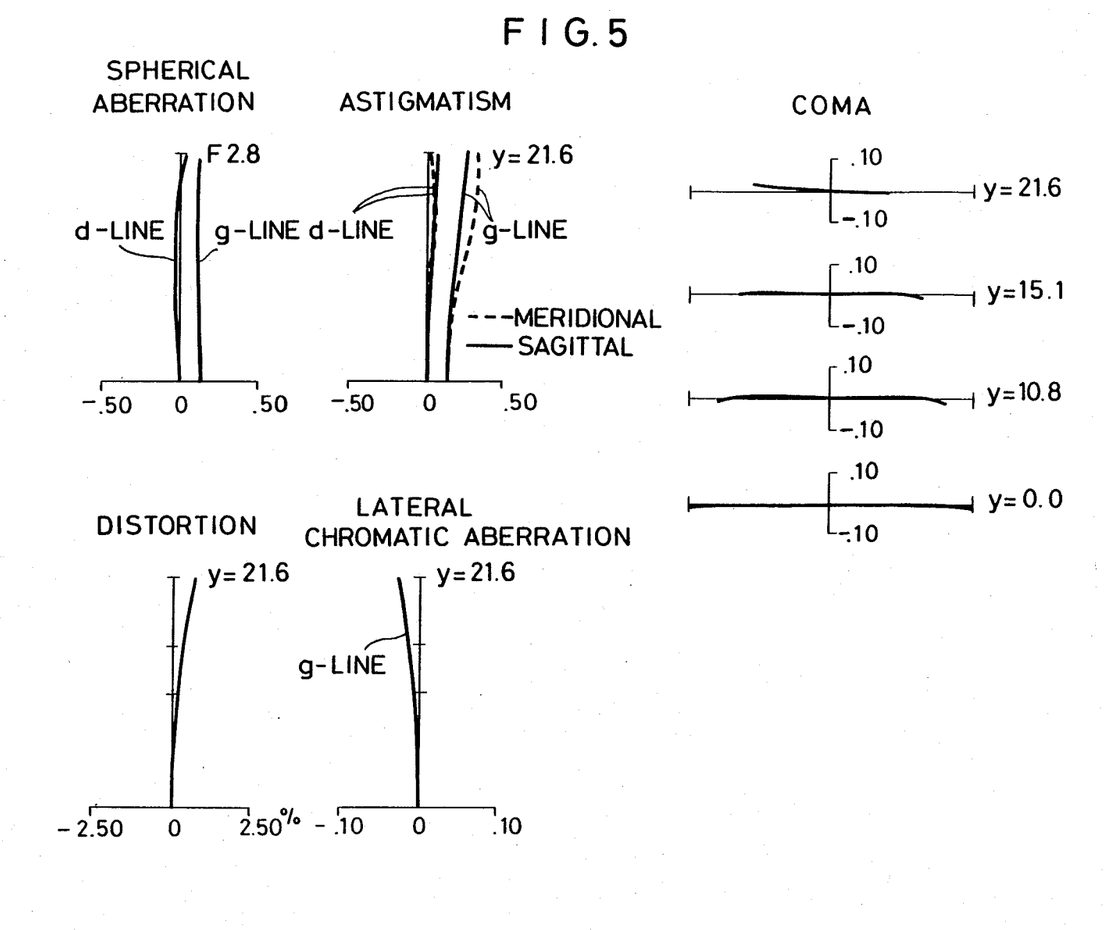
Figure 6:
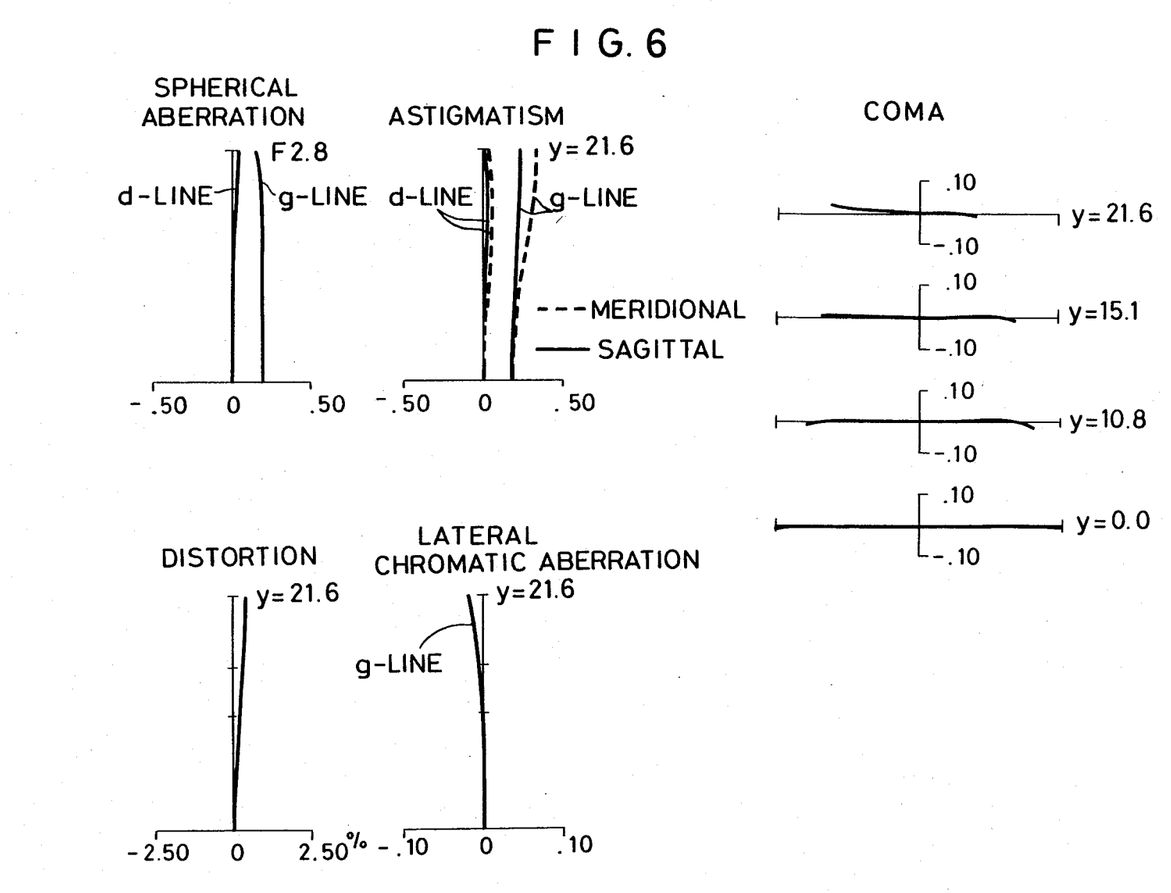
Figure 7:
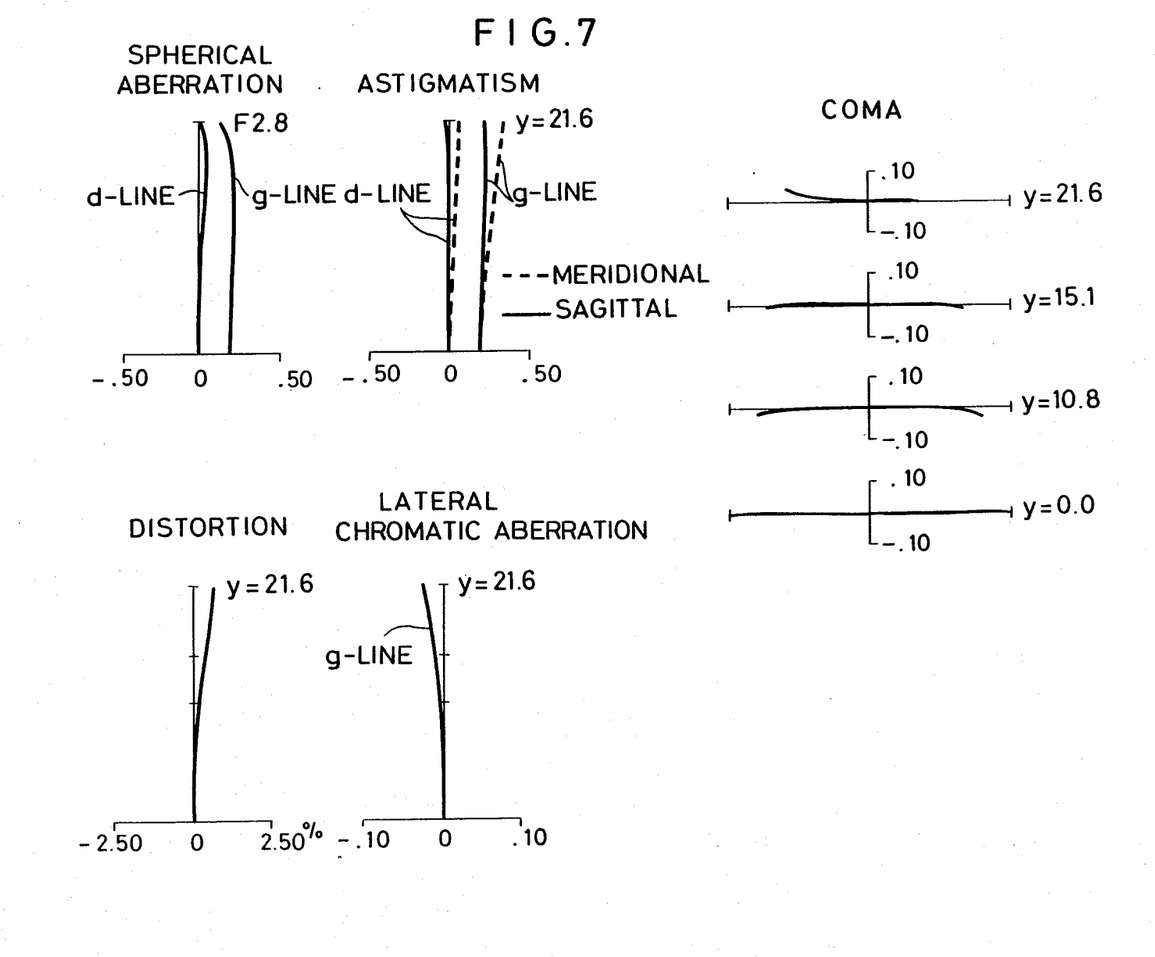

The fourth embodiment of the invention the data of which are shown in the following Table 5 has a construction as shown in FIG. 3. Like the previous embodiments the front group $G_1$ of the fourth embodiment comprises three components. However, as seen from FIG. 3, the second component concavo-concave negative lens $L_2$ and the third component positive lens $L_3$ are cemented together.

In the following tables, the lens surfaces are numbered sequentially from the object side. $R_1$, $R_2$, $R_3$ ... are curvature radii of the respective lens surfaces, $d_1$, $d_2$, $d_3$ ... are lens thicknesses and lens spaces on the axis and $n_1$, $n_2$, $n_3$ ... are refractive indexes. $\nu_1$, $\nu_2$, $\nu_3$ ... are Abbe's numbers of the respective lenses. $d_0$ is the distance from the apex of the frontmost lens surface of the rear conversion lens to the image point formed by the objective lens. Bf is the back focus of the composite system resulting from objective lens and rear conversion lens.

TABLE 1

(Base Objective Lens)
focal length: f = 300  F-number 2.0

| | | | |
|---|---|---|---|
| $R_1 = 443.373$ | $d_1 = 14.500$ | $n_1 = 1.49782$ | $\nu_1 = 82.3$ |
| $R_2 = -745.663$ | $d_2 = 0.500$ | | |
| $R_3 = 235.410$ | $d_3 = 21.000$ | $n_2 = 1.49782$ | $\nu_2 = 82.3$ |
| $R_4 = -599.816$ | $d_4 = 6.850$ | | |
| $R_5 = -527.848$ | $d_5 = 6.000$ | $n_3 = 1.74950$ | $\nu_3 = 35.2$ |
| $R_6 = 473.787$ | $d_6 = 1.700$ | | |
| $R_7 = 176.900$ | $d_7 = 15.000$ | $n_4 = 1.49782$ | $\nu_4 = 82.3$ |
| $R_8 = 558.189$ | $d_8 = 102.701$ | | |
| $R_9 = 749.672$ | $d_9 = 8.000$ | $n_5 = 1.79504$ | $\nu_5 = 28.6$ |
| $R_{10} = -189.496$ | $d_{10} = 3.650$ | $n_6 = 1.51454$ | $\nu_6 = 54.6$ |
| $R_{11} = 125.271$ | $d_{11} = 12.000$ | | |
| $R_{12} = -148.765$ | $d_{12} = 4.800$ | $n_7 = 1.46450$ | $\nu_7 = 65.8$ |
| $R_{13} = 97.985$ | $d_{13} = 28.388$ | | |
| $R_{14} = -1754.216$ | $d_{14} = 1.500$ | $n_8 = 1.68893$ | $\nu_8 = 31.1$ |
| $R_{15} = 110.000$ | $d_{15} = 7.750$ | $n_9 = 1.69350$ | $\nu_9 = 53.8$ |
| $R_{16} = -317.940$ | $d_{16} = 2.000$ | | |
| $R_{17} = 169.454$ | $d_{17} = 2.400$ | $n_{10} = 1.69895$ | $\nu_{10} = 30.1$ |
| $R_{18} = 113.525$ | $d_{18} = 8.000$ | $n_{11} = 1.69680$ | $\nu_{11} = 55.6$ |
| $R_{19} = -254.060$ | Bf = 112.223 | | |

TABLE 2

(First Embodiment)
Magnification: $\beta = 1.4$

| No. | Curvature radius r | Lens thickness and space on axis d | Refractive index n | Abbe's number $\nu$ | | |
|---|---|---|---|---|---|---|
| 1 | 187.079 | 4.000 | 1.59507 | 35.5 | $L_1$ | |
| 2 | −74.937 | 2.000 | | | | |
| 3 | −85.173 | 1.800 | 1.80411 | 46.4 | $L_2$ | $G_1$ |
| 4 | 39.265 | 0.500 | | | | |
| 5 | 46.322 | 4.000 | 1.59507 | 35.5 | $L_3$ | |
| 6 | 1757.000 | 11.500 | | | | |
| 7 | −61.989 | 1.500 | 1.84042 | 43.3 | $L_4$ | |
| 8 | 467.087 | 0.200 | | | | $G_2$ |
| 9 | 56.002 | 6.300 | 1.50137 | 56.5 | $L_5$ | |
| 10 | −104.875 | Bf = 39.238 | | | | |

$d_0 = -48.96756$    $f_1/f_2 = 0.2318$
$f_R = -144.51681$    $f_R/f_1 = 0.82478$
$f_1 = -175.21803$
$f_2 = -755.8748$

TABLE 3

(Second Embodiment)
Magnification: $\beta = 1.4$

| No. | Curvature radius r | Lens thickness and space on axis d | Refractive index n | Abbe's number $\nu$ | | |
|---|---|---|---|---|---|---|
| 1 | 113.000 | 4.000 | 1.59507 | 35.5 | $L_1$ | |
| 2 | −86.753 | 2.000 | | | | |
| 3 | −98.430 | 1.800 | 1.84042 | 43.3 | $L_2$ | $G_1$ |
| 4 | 39.358 | 0.500 | | | | |
| 5 | 42.999 | 4.000 | 1.59507 | 35.5 | $L_3$ | |
| 6 | −6133.792 | 9.000 | | | | |
| 7 | −66.578 | 1.500 | 1.84042 | 43.3 | $L_4$ | |
| 8 | 104.103 | 0.200 | | | | $G_2$ |
| 9 | 62.500 | 5.500 | 1.54814 | 45.9 | $L_5$ | |
| 10 | −83.952 | Bf = 40.136 | | | | |

$d_0 = -48.96756$    $f_1/f_2 = 1.56651$
$f_R = -123.72341$    $f_R/f_1 = 0.393557$
$f_1 = -314.37228$
$f_2 = -200.683$

TABLE 4

(Third Embodiment)
Magnification: $\beta = 1.4$

| No. | Curvature radius r | Lens thickness and space on axis d | Refractive index n | Abbe's number $\nu$ | | |
|---|---|---|---|---|---|---|
| 1 | 105.742 | 4.000 | 1.59507 | 35.5 | $L_1$ | |
| 2 | −84.320 | 2.000 | | | | |
| 3 | −94.430 | 1.800 | 1.84042 | 43.3 | $L_2$ | $G_1$ |
| 4 | 36.942 | 0.500 | | | | |
| 5 | 40.078 | 4.000 | 1.59507 | 35.5 | $L_3$ | |
| 6 | 526.313 | 9.000 | | | | |
| 7 | −54.228 | 1.500 | 1.84042 | 43.3 | $L_4$ | |
| 8 | 201.599 | 0.200 | | | | $G_2$ |
| 9 | 71.405 | 5.500 | 1.53172 | 49.1 | $L_5$ | |
| 10 | −65.918 | Bf = 40.747 | | | | |

$d_0 = -48.96756$    $f_1/f_2 = 0.86764$
$f_R = -131.42138$    $f_R/f_1 = 0.544905$
$f_1 = -241.18199$
$f_2 = -277.97422$

TABLE 5

(Fourth Embodiment)
Magnification: $\beta = 1.4$

| No. | Curvature radius r | Lens thickness and space on axis d | Refractive index n | Abbe's number $\nu$ | | |
|---|---|---|---|---|---|---|
| 1 | 108.394 | 4.000 | 1.60342 | 38.1 | $L_1$ | |
| 2 | −76.063 | 2.000 | | | | |
| 3 | −81.332 | 1.800 | 1.84042 | 43.3 | $L_2$ | $G_1$ |
| 4 | 32.431 | 5.000 | 1.59507 | 35.5 | $L_3$ | |
| 5 | 501.547 | 9.000 | | | | |
| 6 | −66.006 | 1.500 | 1.84042 | 43.3 | $L_4$ | |
| 7 | 179.611 | 0.200 | | | | $G_2$ |
| 8 | 71.857 | 5.500 | 1.54814 | 45.9 | $L_5$ | |
| 9 | −86.708 | 40.216 | | | | |

$d_0 = -48.96756$    $f_1/f_2 = 0.6319$
$f_R = -126.94059$    $f_R/f_1 = 0.62241$
$f_1 = -203.95057$
$f_2 = -322.75133$ The rear conversion lens of the first, second, third or fourth embodiment was attached to the base objective lens to form a composite system having a composite focal length of 420 mm and F-number of 2.8. Aberrations of the composite system were measured for each case. FIGS. 4, 5, 6 and 7 show the aberration graphs for the first, second, third and fourth embodiments, respectively. Aberrations measured are spherical aberration, astigmatism and distortion for d-ray ($\lambda = 587.6$ nm) as reference wavelength, and lateral chromatic aberration and coma for g-ray ($\lambda = 435.8$ nm). Spherical aberration and astigmatism for g-ray are also shown together with those for d-ray.

FIGS. 4 to 7 demonstrate that all of the above embodiments are rear conversion lenses aberration-corrected very well and that they have excellent image-forming performance for their very large relative aperture. It is evident that the high image-forming performance can be maintained even when the rear conversion lenses of the above embodiments are attached to dark objective lenses of larger F-number and therefore they have a wide range of applications.

As readily understood from the foregoing, the present invention has realized an improved type of rear conversion lens which never produces the problem of insufficient marginal light even when the rear conversion lens is attached to a telephoto lens whose exit pupil is at a long distance and which can maintain excellent image-forming performance even when it is attached to an objective lens of very large relative aperture.

What is claimed is:

1. A rear conversion lens to be mounted between an objective lens and a camera body to give the composite system of the lenses a longer focal length than that of said object lens, said rear conversion lens being composed of a front lens group and a rear lens group both having a negative refractive power, the front group comprising a positive lens, a negative lens and a positive lens arranged in the named order from the object side whereas the rear group comprises a negative lens and a positive lens from the object side, which rear conversion lens is characterized in that the lens satisfies the following conditions:

$$0.2 < f_1/f_2 < 4 \quad (1)$$

and $$0.2 < f_R/f_1 < 0.85 \quad (2)$$

wherein,
$f_R$ is the focal length of the rear conversion lens;
$f_1$ is the focal length of the front lens group thereof; and
$f_2$ is the focal length of the rear lens group thereof.

2. A rear conversion lens according to claim 1 which further satisfies the condition:

$$0.04 < |D/f_R| < 0.1$$

wherein,
$f_R$ has the same meaning as defined in claim 1, and
D is the air distance between the front and rear groups.

3. A rear conversion lens according to claim 2 wherein the air distance between the first component positive lens and the second component negative lens of the front group is larger than the air distance between the third component positive lens and the second component negative lens of said front group.

4. A rear conversion lens according to claim 3, which further satisfies the conditions:

$$n-> 1.8 \text{ and } \nu-> 40$$

wherein,
n— is the refractive index of the lenses of negative refractive power in the front and rear groups; and
$\nu$— is Abbe's number of said negative lenses.

5. A rear conversion lens according to claim 4, which further satisfies the condition:

$$0 < Pz \cdot f_R < 0.2$$

wherein,
Pz is Petzval sum of the rear conversion lens and
$f_R$ is the focal length of the rear conversion lens.

6. A rear conversion lens according to claim 5, having the following data:
magnification: $\beta = 1.4$

| No. | Curvature radius r | Lens thickness and space on axis d | Refractive index n | Abbe's number $\nu$ | | |
|---|---|---|---|---|---|---|
| 1 | 187.079 | 4.000 | 1.59507 | 35.5 | $L_1$ | |
| 2 | −74.937 | 2.000 | | | | |
| 3 | −85.173 | 1.800 | 1.80411 | 46.4 | $L_2$ | $G_1$ |
| 4 | 39.265 | 0.500 | | | | |
| 5 | 46.322 | 4.000 | 1.59507 | 35.5 | $L_3$ | |
| 6 | 1757.000 | 11.500 | | | | |
| 7 | −61.989 | 1.500 | 1.84042 | 43.3 | $L_4$ | |
| 8 | 467.087 | 0.200 | | | | $G_2$ |
| 9 | 56.002 | 6.300 | 1.50137 | 56.5 | $L_5$ | |
| 10 | −104.875 | Bf = 39.238 | | | | |

$d_0 = -48.96756$   $f_1/f_2 = 0.2318$
$f_R = -144.51681$   $f_R/f_1 = 0.82478$
$f_1 = -175.21803$
$f_2 = -755.8748$ wherein,
the number in the first column is the lens surface number numbered sequentially from the ojbect side;
$f_R$ is the focal length of the rear conversion lens;
$f_1$ is the focal length of the front lens group;
$f_2$ is the focal length of the rear lens group;
$d_0$ is the distance from the apex of the frontmost lens surface of the rear conversion lens to the image point formed by the objective lens to which the rear conversion lens is attached; and
Bf is the back focus of the composite system resulting from the rear conversion lens and the objective lens.

7. A rear conversion lens according to claim 5, as represented by the following data:
magnification: $\beta = 1.4$

| No. | Curvature radius r | Lens thickness and space on axis d | Refractive index n | Abbe's number $\nu$ | | |
|---|---|---|---|---|---|---|
| 1 | 113.000 | 4.000 | 1.59507 | 35.5 | $L_1$ | |
| 2 | −86.753 | 2.000 | | | | |
| 3 | −98.430 | 1.800 | 1.84042 | 43.3 | $L_2$ | $G_1$ |
| 4 | 39.358 | 0.500 | | | | |
| 5 | 42.999 | 4.000 | 1.59507 | 35.5 | $L_3$ | |
| 6 | −6133.792 | 9.000 | | | | |
| 7 | −66.578 | 1.500 | 1.84042 | 43.3 | $L_4$ | |
| 8 | 104.103 | 0.200 | | | | $G_2$ |
| 9 | 62.500 | 5.500 | 1.54814 | 45.9 | $L_5$ | |
| 10 | −83.952 | Bf = 40.136 | | | | |

$d_0 = -48.96756$   $f_1/f_2 = 1.56651$
$f_R = -123.72341$   $f_R/f_1 = 0.393557$
$f_1 = -314.37228$
$f_2 = -200.683$ wherein,
the number in the first column is the lens surface number numbered sequentially from the object side;
$f_R$ is the focal length of the rear conversion lens;
$f_1$ is the focal length of the front lens group;
$f_2$ is the focal length of the rear lens group;
$d_0$ is the distance from the apex of the frontmost lens surface of the rear conversion lens to the image point formed by the objective lens to which the rear conversion lens is attached; and
Bf is the back focus of the composite system resulting from the rear conversion lens and the objective lens.

8. A rear conversion lens according to claim 5, as represented by the following data:
magnification: $\beta = 1.4$

| No. | Curvature radius r | Lens thickness and space on axis d | Refractive index n | Abbe's number $\nu$ | | |
|---|---|---|---|---|---|---|
| 1 | 105.742 | 4.000 | 1.59507 | 35.5 | $L_1$ | |
| 2 | −84.320 | 2.000 | | | | |
| 3 | −98.430 | 1.800 | 1.84042 | 43.3 | $L_2$ | $G_1$ |
| 4 | 36.942 | 0.500 | | | | |
| 5 | 40.078 | 4.000 | 1.59507 | 35.5 | $L_3$ | |
| 6 | 526.313 | 9.000 | | | | |
| 7 | −54.228 | 1.500 | 1.84042 | 43.3 | $L_4$ | |
| 8 | 201.599 | 0.200 | | | | $G_2$ |
| 9 | 71.405 | 5.500 | 1.53172 | 49.1 | $L_5$ | |
| 10 | −65.918 | Bf = 40.747 | | | | |

$d_0 = -48.96756$   $f_1/f_2 = 0.86764$
$f_R = -131.42138$   $f_R/f_1 = 0.544905$
$f_1 = -241.18199$
$f_2 = -277.97422$ wherein,
the number in the first column is the lens surface number numbered sequentially from the object side;
$f_R$ is the focal length of the rear conversion lens;
$f_1$ is the focal length of the front lens group;
$f_2$ is the focal length of the rear lens group;
$d_0$ is the distance from the apex of the frontmost lens surface of the rear conversion lens to the image point formed by the objective lens to which the rear conversion lens is attached; and Bf is the back focus of the composite system resulting from the rear conversion lens and the objective lens.

9. A rear conversion lens according to claim 5, as represented by the following data: magnification: $\beta = 1.4$

| No. | Curvature radius r | Lens thickness and space on axis d | Refractive index n | Abbe's number $\nu$ | | |
|-----|---------|-------|---------|------|-------|-----|
| 1 | 108.394 | 4.000 | 1.60342 | 38.1 | $L_1$ | |
| 2 | −76.063 | 2.000 | | | | $G_1$ |
| 3 | −81.332 | 1.800 | 1.84042 | 43.3 | $L_2$ | |
| 4 | 32.431 | 5.000 | 1.59507 | 35.5 | $L_3$ | |
| 5 | 501.547 | 9.000 | | | | |
| 6 | −66.006 | 1.500 | 1.84042 | 43.3 | $L_4$ | |
| 7 | 179.611 | 0.200 | | | | $G_2$ |
| 8 | 71.857 | 5.500 | 1.54814 | 45.9 | $L_5$ | |

-continued

| No. | Curvature radius r | Lens thickness and space on axis d | Refractive index n | Abbe's number $\nu$ |
|-----|---------|-------|---|---|
| 9 | −86.708 | Bf = 40.216 | | |

$d_0 = -48.96756$
$f_R = -126.94059$
$f_1 = -203.95057$
$f_2 = -322.75133$ $f_1/f_2 = 0.6319$
$f_R/f_1 = 0.62241$ wherein, the number in the first column is the lens surface number numbered sequentially from the object side;

$f_R$ is the focal length of the rear conversion lens;

$f_1$ is the focal length of the front lens group;

$f_2$ is the focal length of the rear lens group;

$d_0$ is the distance from the apex of the frontmost lens surface of the rear conversion lens to the image point formed by the objective lens to which the rear conversion lens is attached; and Bf is the back focus of the composite system resulting from the rear conversion lens and the objective lens.

* * * * *